(12) United States Patent
Sumner

(10) Patent No.: US 6,963,840 B2
(45) Date of Patent: Nov. 8, 2005

(54) METHOD FOR INCORPORATING MULTIPLE CURSORS IN A SPEECH RECOGNITION SYSTEM

(75) Inventor: Charles Sumner, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 09/760,279

(22) Filed: Jan. 12, 2001

(65) Prior Publication Data

US 2002/0095291 A1  Jul. 18, 2002

(51) Int. Cl.[7] ............................................. G10L 21/00
(52) U.S. Cl. ..................... 704/270; 704/235; 704/275
(58) Field of Search .............................. 704/235, 251, 704/275, 270; 715/531, 533

(56) References Cited

U.S. PATENT DOCUMENTS

| | | | | |
|---|---|---|---|---|
| 4,914,704 A | * | 4/1990 | Cole et al. .................. | 704/235 |
| 5,829,000 A | * | 10/1998 | Huang et al. ............... | 704/252 |
| 5,909,667 A | * | 6/1999 | Leontiades et al. ......... | 704/275 |
| 5,960,447 A | * | 9/1999 | Holt et al. .................. | 715/500 |
| 6,064,959 A | * | 5/2000 | Young et al. ............... | 704/251 |
| 6,195,637 B1 | * | 2/2001 | Ballard et al. .............. | 704/235 |
| 6,457,031 B1 | * | 9/2002 | Hanson ....................... | 715/531 |
| 2002/0138265 A1 | * | 9/2002 | Stevens et al. ............. | 704/251 |

OTHER PUBLICATIONS

Courter et al. "Mastering Microsoft Office 2000 Professional Edition" 1999, Sybex, pp. 92-100.*
IBM Research Disclosure, "Marking Locations in Material Dictated into a Speech Recognition System," Feb. 1999, IBM, vol. 42, Issure 418, p. 1.*

* cited by examiner

*Primary Examiner*—Richemond Dorvil
*Assistant Examiner*—V. Paul Harper
(74) *Attorney, Agent, or Firm*—Akerman Senterfitt

(57) ABSTRACT

In a speech recognition system, a method for using multiple cursors for dictation and correction of text can include a series of steps. The steps can include detecting whether a correction marker has been included within a body of text and searching for a user specified portion of text to be corrected within the body of text. The method further can include selecting the user specified portion of text and substituting an alternate user specified portion of text for the user specified portion of text within the body of text. The step of locating the correction marker within the body of text at a location defined by the alternate user specified portion of text further can be included. Additionally, the method can include the step of relocating an insertion cursor to the end of the body of text.

19 Claims, 3 Drawing Sheets

METHOD FOR INCORPORATING MULTIPLE CURSORS IN A SPEECH RECOGNITION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition, and more particularly, to the use of multiple cursors for dictation and correction within a speech recognition system.

2. Description of the Related Art

Speech recognition is the process by which an acoustic signal received by microphone is converted to a set of text words by a computer. These recognized words may then be used in a variety of computer software applications for purposes such as document preparation, data entry, and command and control. Improvements to speech recognition systems provide an important way to enhance user productivity.

When using a speech recognition system, a typical dictation function can include dictating to the speech recognition system and subsequently correcting any speech recognition errors. This process is often cyclical in nature in that a user will often dictate part of a body of text and correct that part of text before dictating additional text. For example, a user can dictate several paragraphs of a document. Before continuing to dictate the remainder of the document, the user can correct those dictated paragraphs.

Conventional methods of correcting speech recognition errors involve the user reading recognized text in an effort to proofread, or visually check, the accuracy of the recognized text. When an incorrect word is found by the user, the user can select that word using a command initiated by voice, a pointer, or one or more keystrokes. Additionally, the user can initiate a correction function to correct the selected incorrect word. For example, if the user says "correct <picture>", the speech recognition system can select the first occurrence of the word "picture" beginning from the location of an insertion cursor within the body of text. The insertion cursor, as is known in the art, can be represented with an "I" or an I-beam type character. A common example of an insertion cursor can be the cursor within a word processing application program. The insertion cursor can denote the location where new text will be inserted within a document, or body of text, when typed or recognized from a user spoken utterance.

When the user specified word is selected, in this case the word "picture", the insertion cursor of an application program such as a word processor can be relocated to the point of correction. The point of correction in this case can be the location of the selected word within the body of text. In this manner, when a correct or alternate word is selected by the user during the correction function, that word can be substituted for the selected incorrect word within the body of text. After insertion of the alternate word within the body of text, the insertion cursor can be located immediately after the newly inserted word. If the user initiates a second correction function immediately following the first, the speech recognition system can search for the second incorrect word starting at the location of insertion cursor. In that case, the entire dictated body of text need not be searched and the correction function can track the user's proofreading process.

In most cases, however, a user's intent is to continue dictation from the end of a body of text in order to complete the document in progress. To relocate the insertion cursor so that dictation can continue, the user must issue one or more speech commands or pointer initiated commands to relocate the insertion cursor to the end of the body of text.

Conventional methods of correcting speech recognition errors can have disadvantages. One such disadvantage is that, as a practical matter, after a user completes a speech correction function, the user's instinct is to resume dictation without first relocating the insertion point to the end of the body of text where additional text is typically added. As a result, the user's dictation can be inserted into the document in an incorrect or undesired location. To remove the misplaced text, the user must discontinue dictation, remove the misplaced text, relocate the insertion cursor to a desired location, and then continue dictation. Such hindrances can discourage users from using the correction functions within speech recognition systems. Moreover, non-use of the correction function to correct speech recognition errors can affect speech recognition system performance as the system will be unable to learn from past errors. Consequently, the performance of speech recognition systems can suffer.

One method of dealing with this problem has been to force the insertion cursor to be relocated at the end of a body of text after each correction. This proposed solution, however, has disadvantages. One such disadvantage relates to the manner in which speech recognition systems search for user specified words to correct. In operation, when a correction function is initiated, the speech recognition system can begin searching for a user specified word from the location of the insertion cursor toward the end of the body of text. Thus, when the insertion cursor is relocated to the end of a body of text, the next initiation of the correction function typically defaults to searching for the user specified word from the beginning of the body of text. In cases where there are multiple occurrences of a word, the speech recognition system will select the first occurrence of the user specified word, rather than continuing from the last corrected word. The user must then command the speech recognition system to continue to the next occurrence until the user desired word is selected. Notably, this method does not track the natural flow of a user proofreading a document and forces a user to correct previously corrected portions of text.

Another proposed solution has been to allow the user to place the insertion cursor at the point within the body of text where the user most recently initiated the correction function. In addition to requiring an extra step, however, this approach requires the user to recall where in the document the user stopped proofreading, as well as the location of the last word corrected using the correction function. Moreover, requiring the user to manually relocate the insertion cursor can be contrary to the user's instinct to begin dictation upon completion of the correction function.

SUMMARY OF THE INVENTION

The invention concerns a method of using multiple cursors for dictation and correction. The invention incorporates a second position marker in addition to using a conventional cursor, referred to as an insertion cursor. This second position marker, which can be referred to as a correction cursor, can be used to mark portions of text within a body of text or document which the user has corrected using a speech recognition correction function. Thus, text insertion and speech recognition correction, two independent functions, can be tracked by the speech recognition system independently of one another using the two separate cursors. Because the insertion cursor can be located within the body of text independently of the correction cursor, subsequent dictation can be included within the body of text without the user having to relocate the insertion cursor prior to dictating. Using the invention, the user can correct speech recognition errors in a manner which more closely tracks the method of proofreading typically performed by the user.

One aspect of the invention can be a method of using multiple cursors for dictation and correction. The method can include initiating a dictation correction function responsive to a user command specifying the portion of text to be corrected. The method further can include the steps of detecting whether a correction marker has been included within a body of text and searching for a user specified portion of text to be corrected within the body of text. If a correction marker has been detected, the searching step can begin searching the body of text from the correction marker toward the end of the body of text. If a correction marker has not been detected, the searching step can begin searching the body of text from the beginning of the body of text toward the end of the body of text. The steps of selecting the user specified portion of text and substituting an alternate user specified portion of text for the user specified portion of text within the body of text can be included. The method can include locating the correction marker within the body of text at a location defined by the alternate user specified portion of text. Additionally, the method can include relocating an insertion cursor to the end of the body of text.

In another embodiment of the invention, the method can include the step of searching for a second portion of text specified by the user starting from the location of the correction marker responsive to a second user command specifying the second portion of text. The correction marker can be visible or invisible to the user. Notably, the visual representation of the correction marker can be turned on or off responsive to a user command. Also, the method can include the step of relocating the correction cursor to a user specified location responsive to a user command.

Still, another embodiment of the invention can be a method of using multiple cursors for dictation and correction. The method can include the step of providing two independent cursors. The first cursor can identify a location for insertion of additional dictated text. The second cursor can identify a location for insertion of alternate text. The step of inserting additional dictated text at the location identified by the first cursor can be included. Also, the method can include the step of inserting alternate text at the location identified by the second cursor.

Another aspect of the invention can be a machine readable storage, having stored thereon a computer program having a plurality of code sections executable by a machine for causing the machine to perform a series of steps. The steps can include initiating a dictation correction function responsive to a user command specifying the portion of text to be corrected. The steps of detecting whether a correction marker has been included within a body of text and searching for a user specified portion of text to be corrected within the body of text can be included. If the correction marker has been detected, the searching step can begin searching the body of text from the correction marker toward the end of the body of text. If the correction marker has not been detected, the searching step can begin searching the body of text from the beginning of the body of text toward the end of the body of text. Also included in the method can be the steps of selecting the user specified portion of text and substituting an alternate user specified portion of text for the user specified portion of text within the body of text. The method further can include locating the correction marker within the body of text at a location defined by the alternate user specified portion of text and relocating an insertion cursor to the end of the body of text.

Another embodiment of the invention can include the step of searching for a second portion of text specified by the user starting from the location of the correction marker responsive to a second user command specifying the second portion of text. The correction marker can be visible or invisible to the user. Notably, a visual representation of the correction marker can be turned on or off responsive to a user command. Additionally, the method can include the step of relocating the correction cursor to a user specified location responsive to a user command.

BRIEF DESCRIPTION OF THE DRAWINGS

There are shown in the drawings embodiments which are presently preferred, it being understood, however, that the invention is not so limited to the precise arrangements and instrumentalities shown, wherein.

DETAILED DESCRIPTION OF THE INVENTION

The invention provides a method for correction of speech recognition errors and for continued dictation within a speech recognition system. In particular, the invention incorporates multiple cursors to allow a user to correct speech recognition errors and continue dictation in a natural manner. Using the invention, the user can correct speech recognition errors in a manner which more closely tracks the method of proofreading typically performed by the user. In addition to using a conventional cursor, referred to as an insertion cursor, the invention incorporates a second position marker. This second position marker, which can be referred to as a correction cursor, can be used to mark portions of text within a body of text or document which the user has selected for correction. Thus, text insertion and speech recognition correction, two independent functions, can be tracked by the speech recognition system independently of one another.

For example, if a user initiates a correction function within a speech enabled word processor, the user can select a speech recognition error. The exemplary user speech command "correct <HOUSE>" can cause the speech recognition system to select the first occurrence of the word "HOUSE" and enter a correction mode so that the user can select a correct alternative to the erroneous word "HOUSE". After insertion of the correct word, the speech recognition system can mark the insertion location with the correction cursor. In this manner, the speech recognition system can continue future corrections from the last point of correction within the body of text. Notably, when the correction function completes, the insertion cursor can be relocated to the end of the body of text for future dictation. If the user initiates a second correction function, the speech recognition system can continue with the correction process from the last point of correction, rather than searching for a user specified word from the beginning of the body of text.

Figure 1:
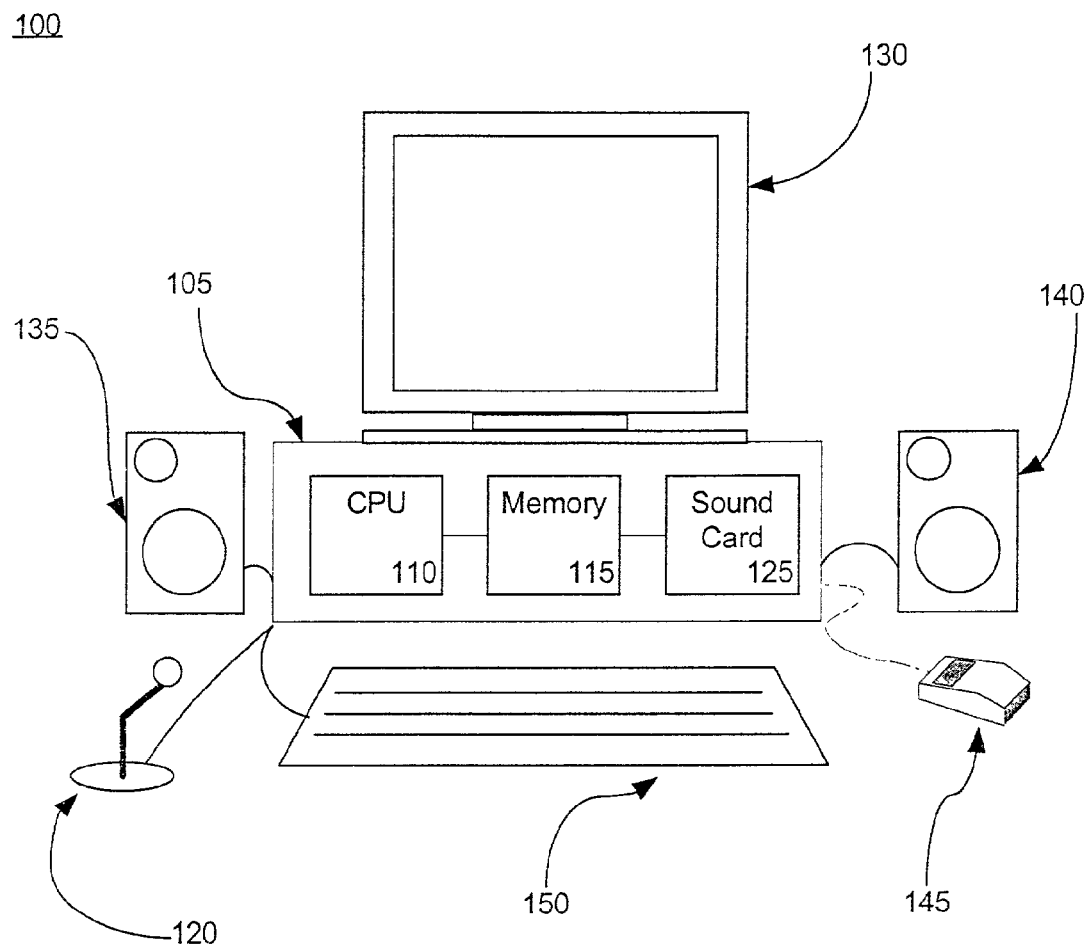
FIG. 1 is a schematic of an exemplary computer system for speech recognition on which the invention can be used.

FIG. 1 shows a typical computer system 100 for use in conjunction with the present invention. The system is preferably comprised of a computer 105 including a central processing unit 110 (CPU), one or more memory devices 115 and associated circuitry. The system also includes a microphone 120 operatively connected to said computer system through suitable interface circuitry or "sound card" 125, and at least one user interface display unit 130 such as a video data terminal operatively connected thereto. The CPU can be comprised of any suitable microprocessor or other electronic processing unit, as is well known to those skilled in the art. Speakers 135 and 140, as well as an interface device, such as mouse 145, and keyboard 150, can be provided with the system, but are not necessary for operation of the invention as described herein. The various hardware requirements for the computer system as described herein can generally be satisfied by any one of many commercially available high speed multimedia personal computers.

Figure 2:
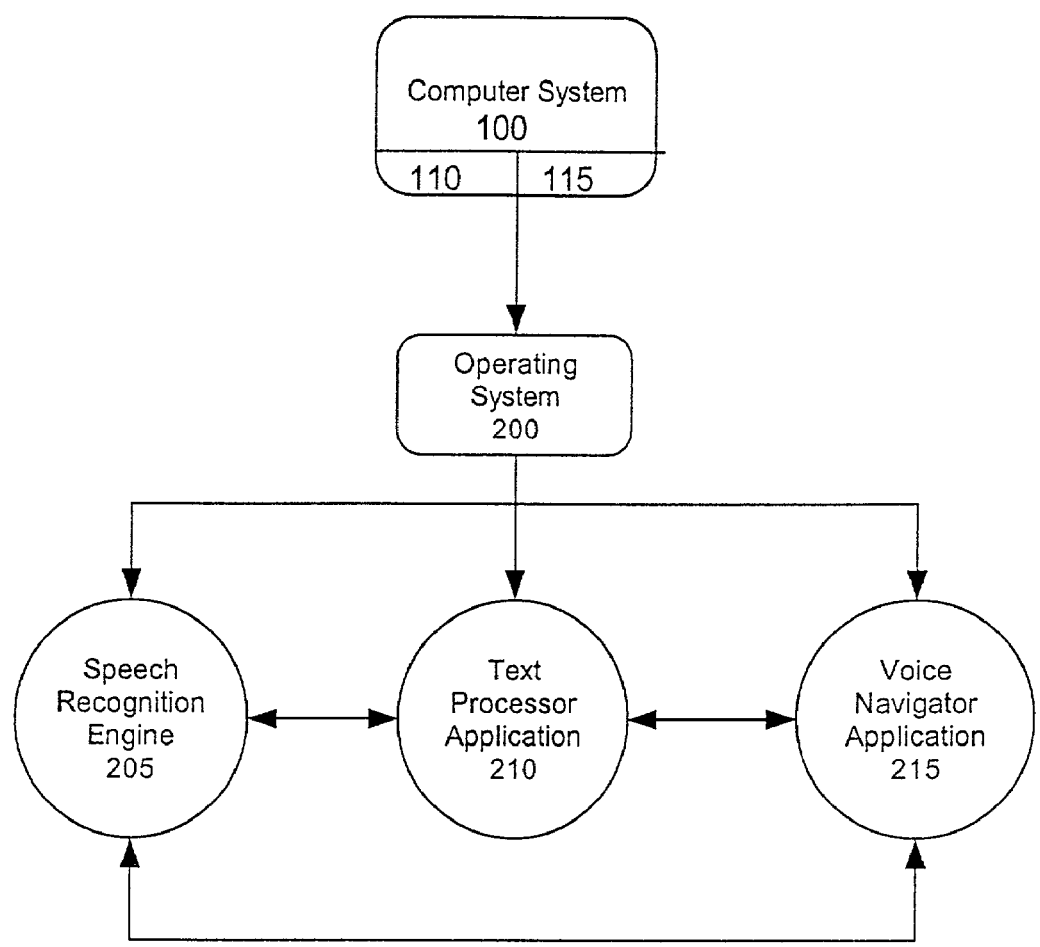
FIG. 2 is a block diagram showing a typical high level architecture for the computer system of FIG. 1.

FIG. 2 illustrates a typical architecture for a speech recognition system in computer system 100. As shown in FIG. 2, within the memory 115 of computer system 100 can be an operating system 200 and a speech recognition engine application 205. In the example shown, a speech text processor application 210 and a voice navigator application 215 also are provided. However the invention is not limited in this regard and the speech recognition engine application 205 can be used with any other application program which is to be voice enabled. In FIG. 2, the speech recognition engine 205, speech text processor 210 and the voice navigator 215 are shown as separate application programs. It should be noted however that the invention is not limited in this regard, and these various application programs could be implemented as a single, more complex application program. For example the speech recognition application 205 could be combined with the speech text processor application or with any other application to be used in conjunction with the speech recognition application. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

The system as disclosed herein can be implemented by a programmer, using commercially available development tools for the particular operating system used. As shown in FIG. 2, computer system 100 includes a computer memory device 115, which is preferably comprised of an electronic random access memory and a bulk data storage medium, such as a magnetic disk drive.

Audio signals representative of sound received in microphone 120 are processed within computer 100 using conventional computer audio circuitry so as to be made available to the operating system 200 in digitized form. The audio signals received by the computer are conventionally provided to the speech recognition engine application 205 via the computer operating system 200 in order to perform speech recognition functions. As in conventional speech recognition systems, the audio signals are processed by the speech recognition engine 205 to identify words spoken by a user into microphone 120.

Figure 3:
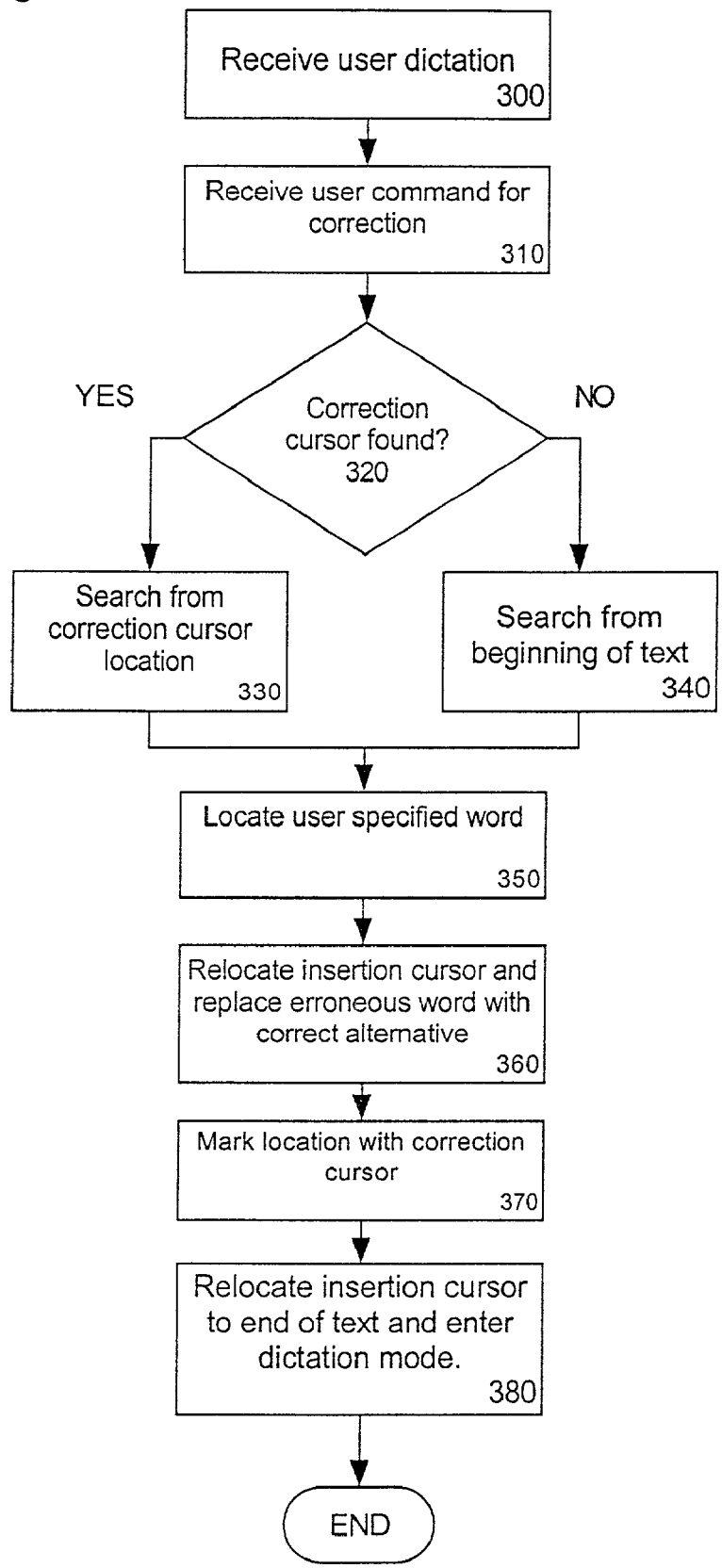
FIG. 3 illustrates an exemplary method of the invention.

FIGS. 3A and 3B, taken together, illustrate a process for incorporating two cursors within a speech recognition system (SRS) for correction of speech recognition errors and continued dictation as performed by the exemplary SRS of FIG. 2. According to one embodiment of the invention, in step 300, the SRS can receive user dictation and convert the received dictation to text. The text can be included within a document such that the dictation can be the entire body of text in the document or can be added to text already existing in the document. Regardless, after receiving the user dictation in step 300, the SRS can continue to step 310.

In step 310 the SRS can receive a user command initiating a correction function, thereby causing the SRS to operate in a correction mode. In addition to initiating a correction mode, the user command further can specify an incorrectly recognized portion of text or word to be corrected. The user command can be a single user command or a series of commands. In either case, the user commands can be pointer manipulations, keystrokes, or speech commands. In the case of a speech command, for example, the user can issue the command "correct <HOUSE>". Responsive to that user command, the SRS can enter a correction mode, and further, locate the incorrectly recognized word specified by the user. After receiving the user command for initiating the correction mode in step 310, the SRS can proceed to step 320.

In step 320, the SRS can determine whether the document being corrected by the user contains a marker, in this case a correction cursor. In particular, the existence of a correction cursor within the document can indicate that the user has previously corrected a portion of the text within that document. If the SRS detects a correction cursor within the document, the SRS can continue to step 330. If not, the SRS can continue to step 340.

In step 330, the SRS has detected the existence of a correction cursor. Accordingly, beginning at the location marked by the correction cursor, the SRS can search the body of text for the user specified word. Using the previous example, the SRS can search for the word "HOUSE" from the location of the correction cursor. As mentioned, the existence of the correction cursor within a document can indicate that the text preceding the correction cursor has previously been corrected. Thus, subsequent correction functions need not begin searching for speech recognition errors from the beginning of a document. Rather, the SRS can search for the user specified portion of text, in this case the word "HOUSE", from a point immediately following the insertion point of a previously corrected portion of text.

If the SRS does not detect a correction cursor, the SRS can proceed to step 340. In that case, the SRS can begin searching for the user specified word from the beginning of the document. Notably, the lack of a correction cursor can indicate that the correction function presently underway is the user's first correction function with respect to the document being edited. Accordingly, the SRS can search for user specified speech recognition errors from the beginning of the document. After completion of step 330 or step 340, the SRS can continue to step 350.

In step 350, the SRS can locate the user specified word to be corrected. For example, the SRS can search the body of text within the document being edited from the beginning of the document or the location of the correction cursor. After the user specified word is located, the SRS can continue to step 360.

In step 360 the SRS can select the user specified word. Notably, the SRS further can relocate the insertion cursor of the application program to the location of the selected word. Thus, when the user specifies the correct alternative word for the incorrectly recognized and selected word, the SRS can replace the incorrect text with the correct user specified alternative text. For example, the SRS can locate and select the word "HOUSE" within the document being edited. The user can select or specify the correct word to replace the incorrectly recognized word "HOUSE". For example, the user can select the correct alternate choice from a list of alternative texts or type in the correct text to replace the incorrectly recognized text. In this case, for example, the user can specify that the correct word alternate is "HORSE". Accordingly, the SRS can replace the selected incorrect word "HOUSE" with the correct user specified word "HORSE". After completion of step 360, the SRS can continue to step 370.

In step 370, the SRS can place a correction cursor at a point within the body of text immediately following the corrected text, in this case the word "HORSE". The correction cursor can be visible to the user so that the user can visually note that the text preceding the correction cursor location has been corrected. Notably, the manner in which the SRS marks the most recent correction point need not be any particular format. For example, the SRS can highlight, underline, italicize, or bold the last corrected word. Similarly, the SRS can locate any other type of symbol or notation, such as a unique cursor design, following the corrected text denoting the location of the most recent correction.

Additionally, the marker can be made invisible to the user. For example, after the user has exited the correction mode, the SRS can cause the marker to be hidden from the user so as to not produce a distraction during subsequent dictation. The marker again can be made visible responsive to a user command initiating the correction mode. Notably, the user can be provided with control parameters for choosing when, if at all, the correction cursor is to be made visible to the user. The user further can be provided with commands for immediately making the correction cursor visible or invisible so that the user can visually locate the correction cursor. For example, the user can command the SRS to display the correction cursor so that the user can manually relocate the correction cursor. After relocating the correction cursor, the user can command the SRS to make the correction cursor invisible once again. After completion of step 370, the system can continue to step 380.

In step 380 the SRS can relocate the insertion cursor to the end of the body of text within the document being edited and terminate the correction function. Notably, the correction cursor can remain at the point immediately following the most recently corrected portion of text. Accordingly, if the user initiates a subsequent correction function, the SRS can detect the location of the correction cursor and search the body of text for the user specified word from the location of the correction cursor forward, toward the end of the body of text. By restarting the correction process from the most recent correction point, the SRS need not search text that has been previously corrected for potential incorrectly recognized words or text. Moreover, such an approach can eliminate the need for the user to skip beyond previously corrected text or other instances of the user specified text to reach the actual user intended and specified incorrect text. If the user desires to correct another portion of text, the method can be performed in an iterative manner. For example, if the SRS receives another user command for correction of text, the SRS can loop back to step 310 to perform the method of the invention once again. If after correcting the text, however, the user begins dictating to the SRS, the SRS can insert that text at the location of the insertion cursor at the end of the body of previously dictated text.

The present invention can be realized in hardware, software, or a combination of hardware and software. A method for incorporating multiple cursors in a speech recognition system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. In a speech recognition system, a method of using multiple cursors for dictation and correction, said method comprising the steps of:

simultaneously establishing and maintaining a correction cursor and an insertion cursor within a body of text, wherein said correction cursor is associated with a speech correction function, and wherein said insertion cursor is associated with a speech insertion function;

when a speech recognition system enters a correction mode, detecting location in the body of text specified by said correction cursor;

beginning at the detected location, searching for a user specified portion of text to be corrected within said body of text;

locating the user specified portion of text;

substituting an alternate user specified portion of text for said user specified portion of text within said body of text;

automatically relocating said correction cursor within said body of text at a location defined by said alternate user specified portion of text, and when a speech recognition system enters a dictation mode, automatically relocating the insertion cursor to the end of said body of text.

2. The method of claim 1, further comprising:

before said substituting step, automatically relocating the insertion cursor to a location of the located portion of text.

3. The method of claim 1, further comprising:

establishing an initial default location for the correction cursor at the beginning of said body of text.

4. The method of claim 1, further comprising:

initiating a dictation correction function responsive to a user command, said user command specifying said portion of text to be corrected.

5. The method of claim 1, further comprising:
  searching for a second portion of text specified by said user starting from said location of said correction cursor responsive to a second user command specifying said second portion of text.

6. The method of claim 1, wherein said correction cursor is visible to said user.

7. The method of claim 1, wherein said correction cursor is invisible to said user.

8. The method of claim 1, wherein a visual representation of said correction cursor is turned on or off responsive to a user command.

9. The method of claim 1, further comprising:
  relocating said correction cursor to a user specified location responsive to a user command.

10. In a speech recognition system, a method of using multiple cursors for dictation and correction, said method comprising the steps of:
  simultaneously establishing and maintaining a correction cursor and an insertion cursor within a body of text, wherein said correction cursor is associated with a speech correction function, and wherein said insertion cursor is associated with a speech insertion function;
  when a speech recognition system is a correction mode and is searching the body of text for a portion of text to replace, beginning said search at a location specified by the correction cursor;
  after replacing a portion of text, automatically moving the correction cursor to a location within the body of text immediately after the replaced portion of text; and
  when the speech recognition system changes from the correction mode to a dictation mode, inserting text from a new dictation starting at a location in the body of text indicated by the insertion cursor without requiring a user to specifically navigate to the location indicated by the insertion cursor.

11. A machine readable storage, having stored thereon a computer program having a plurality of code sections executable by a machine for causing the machine to perform the steps of:
  simultaneously establishing and maintaining a correction cursor and an insertion cursor within a body of text, wherein said correction cursor is associated with a speech correction function, and wherein said insertion cursor is associated with a speech insertion function;
  when a speech recognition system enters a correction mode, detecting location in the body of text specified by said correction cursor;
  beginning at the detected location, searching for a user specified portion of text to be corrected within said body of text;
  locating the user specified portion of text;
  substituting an alternate user specified portion of text for said user specified portion of text within said body of text;
  automatically relocating said correction cursor within said body of text at a location defined by said alternate user specified portion of text; and
  when a speech recognition system enters a dictation mode, automatically relocating the insertion cursor to the end of said body of text.

12. The machine readable storage of claim 11, further comprising:
  before said substituting step, automatically relocating the insertion cursor to a location of the located portion of text.

13. The machine readable storage of claim 11, further comprising:
  establishing an initial default location for the correction cursor at the beginning of said body of text.

14. The machine readable storage of claim 11, further comprising:
  initiating a dictation correction function responsive to a user command, said user command specifying said portion of text to be corrected.

15. The machine readable storage of claim 11, further comprising:
  searching for a second portion of text specified by said user starting from said location of said correction cursor responsive to a second user command specifying said second portion of text.

16. The machine readable storage of claim 11, wherein said correction cursor is visible to said user.

17. The machine readable storage of claim 11, wherein said correction cursor is invisible to said user.

18. The machine readable storage of claim 11, wherein a visual representation of said correction cursor is turned on or off responsive to a user command.

19. The machine readable storage of claim 11, further comprising:
  relocating said correction cursor to a user specified location responsive to a user command.

* * * * *